(12) United States Patent
Van Hensbergen et al.

(10) Patent No.: US 7,376,713 B2
(45) Date of Patent: May 20, 2008

(54) APPARATUS, SYSTEM AND METHOD OF DISTRIBUTING BLOCK DATA ON A PRIVATE NETWORK WITHOUT USING TCP/IP

(75) Inventors: Eric Van Hensbergen, Austin, TX (US); Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1122 days.

(21) Appl. No.: 10/185,702

(22) Filed: Jun. 27, 2002

(65) Prior Publication Data

US 2004/0003127 A1 Jan. 1, 2004

(51) Int. Cl.
*G06F 15/16* (2006.01)
(52) U.S. Cl. ..................... 709/219; 709/227
(58) Field of Classification Search ........ 709/230–236, 709/217–219, 227–229, 246; 711/111–116; 370/389
See application file for complete search history.

(56) References Cited

U.S. PATENT DOCUMENTS

| | | | | |
|---|---|---|---|---|
| 5,473,761 A | * | 12/1995 | Parks et al. ................. | 711/4 |
| 6,286,074 B1 | * | 9/2001 | Batchelor et al. ........... | 710/305 |
| 6,381,677 B1 | * | 4/2002 | Beardsley et al. .......... | 711/137 |
| 6,385,624 B1 | * | 5/2002 | Shinkai ...................... | 707/201 |
| 6,766,430 B2 | * | 7/2004 | Arakawa et al. ............ | 711/165 |
| 6,775,707 B1 | * | 8/2004 | Bennett et al. ............. | 709/233 |
| 6,792,472 B1 | * | 9/2004 | Otterness et al. ........... | 709/239 |
| 6,836,793 B1 | * | 12/2004 | Cesar et al. ................ | 709/221 |
| 6,839,771 B1 | * | 1/2005 | Bouchier et al. ........... | 709/253 |
| 6,851,029 B2 | * | 2/2005 | Matsunami et al. ........ | 711/154 |
| 6,917,967 B2 | * | 7/2005 | Wu et al. ................... | 709/213 |
| 2002/0087786 A1 | * | 7/2002 | Burton et al. ............... | 711/112 |
| 2002/0174297 A1 | * | 11/2002 | McDonald et al. ......... | 711/114 |

\* cited by examiner

*Primary Examiner*—Joseph E. Avellino
(74) *Attorney, Agent, or Firm*—Volel Emile; Casimer K. Salys

(57) ABSTRACT

A system, apparatus and method for transmitting data on a private network in blocks of data without using TCP/IP as a protocol are provided. When data is to be transmitted on a private network, the data is divided into a plurality of packets and a MAC header is added to each packet. The header contains hardware addresses of the transmitting and receiving hosts as well as parameters of the data being transmitted. The hardware addresses are used to route the packets through the private network therefore obviating the use of TCP/IP to perform the same task. The data is ordinarily stored in contiguous sectors of a storage device; thus, ensuring that almost every packet will either contain data from a block of sectors or is a receipt acknowledgement of such packet.

2 Claims, 12 Drawing Sheets

| BIT | 0 | 1 | 2 | 3 | 4 | 5 | 6 | 7 | |
|---|---|---|---|---|---|---|---|---|---|
| BYTE 0 | \multicolumn{8}{c|}{} | |
| BYTE 1 | | |
| BYTE 2 | DESTINATION MAC ADDRESS | 600 |
| BYTE 3 | | |
| BYTE 4 | | |
| BYTE 5 | | |
| BYTE 6 | | |
| BYTE 7 | | |
| BYTE 8 | SOURCE MAC ADDRESS | |
| BYTE 9 | | 602 |
| BYTE 10 | | |
| BYTE 11 | | |
| BYTE 12 | FRAME TYPE | 604 |
| BYTE 13 | | |
| BYTE 14 | OPERATION | 606 |
| BYTE 15 | ID | 608 |
| BYTE 16 | MAJOR | 610 |
| BYTE 17 | MINOR | 612 |
| BYTE 18 | FLOW CONTROL | 614 |
| BYTE 19 | LENGTH | 616 |
| BYTE 20 | | |
| BYTE 21 | SECTOR | 618 |
| BYTE 22 | | |
| BYTE 23 | | |
| BYTE 24 | | |
| BYTE 25 | CRC | 620 |
| BYTE 26 | | |
| BYTE 27 | | |

FIG. 6

APPARATUS, SYSTEM AND METHOD OF DISTRIBUTING BLOCK DATA ON A PRIVATE NETWORK WITHOUT USING TCP/IP

BACKGROUND OF THE INVENTION

1. Technical Field

The present invention is directed to network communications. More specifically, the present invention is directed to a method, system and apparatus for transmitting data across a network in blocks without using TCP/IP to route the data through the network.

2. Description of Related Art

In a distributed computing system, different computers, operating systems and networks interact as if they were all part of a single computer system. As with most computer systems, the distributed computing system has a file system. However, the file system may reside across a few or all the computer systems that make up the distributed computing system. The file system uses a set of global file names to allow any machine in the network to access any file regardless of where the file is physically located. Global file names are part of a shared name space that devices within the distributed file system may access.

Presently, there are many technologies that are used to support distributed computing systems. Some of these technologies are Network File System (NFS), Common Internet File System (CIFS), Network Block device (NBD) and storage over Internet Protocol (IP) or iSCSI (Internet Small Computer System Interface).

NFS is a client/server application that allows network users to access shared files stored on different computer systems of a network. NFS provides access to shared files over TCP/IP (Transport Control Protocol/Internet Protocol). Users can manipulate shared files as if they were stored locally on the user's own hard disk. With NFS, computers connected to a network operate as clients when accessing remote files, and as servers when providing remote users access to local shared files. The NFS standards are publicly available and widely used.

CIFS is a widely used protocol that defines a standard for remote file access. CIFS allows users with different platforms and computers to share files without having to install new software. CIFS runs over TCP/IP but uses SMB (Server Message Block) protocol for file and printer access. Therefore, CIFS allows all applications, not just Web browsers, to open and share files across a network.

NBD or network block device allows systems to use disk space from other systems on the network. An NBD client retrieves data by sending read requests over TCP/IP to a server. Once the server receives a request, it responds with the requested data. Here, a server is any system that provides the requested data to the requesting client.

ISCSI is a new Internet Protocol (IP) based storage networking standard for linking data storage facilities. ISCSI is used to facilitate data transfers over a network and to manage storage over long distances. When an end user or application sends a request, the operating system generates the appropriate SCSI commands and data request. The SCSI commands and data request are broken down into packets to which TCP/IP headers are added. An Ethernet or other low-level network header is then added to each packet before it is transmitted. When a packet is received, it is disassembled, separating the SCSI commands and request. The SCSI commands are sent on to the SCSI controller, and from there to the SCSI storage device. Because iSCSI is bi-directional, the protocol is also used to return data in response to the original request.

As can be seen, TCP/IP is used in conjunction with all the technologies mentioned above. TCP/IP was developed to support an unreliable and widely dispersed network. As such, a lot of safeguards were used to ensure data transmission integrity. As it is well known, the more safeguards that are used in a system, the more complex the system; the more complex the system, the greater the overhead associated with the system.

Therefore, it would be desirable to design an apparatus, method and system for transmitting data in a private network that is devoid of the complexity associated with the use of TCP/IP.

SUMMARY OF THE INVENTION

The present invention provides a system, apparatus and method for transmitting data on a private network in blocks of data without using TCP/IP as a protocol. When data is to be transmitted on a private network, the data is divided into a plurality of packets and a MAC header is added to each packet. The header contains hardware addresses of the transmitting and receiving hosts as well as parameters of the data being transmitted. The hardware addresses are used to route the packets through the private network therefore obviating the use of TCP/IP to perform the same task. The data is ordinarily stored in contiguous sectors of a storage device; thus, ensuring that almost every packet will either contain data from a block of sectors or is a receipt acknowledgement of such packet.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts an Ethernet header in byte format in accordance with the present invention.

DETAILED DESCRIPTION OF THE PREFERRED EMBODIMENT

Figure 1:
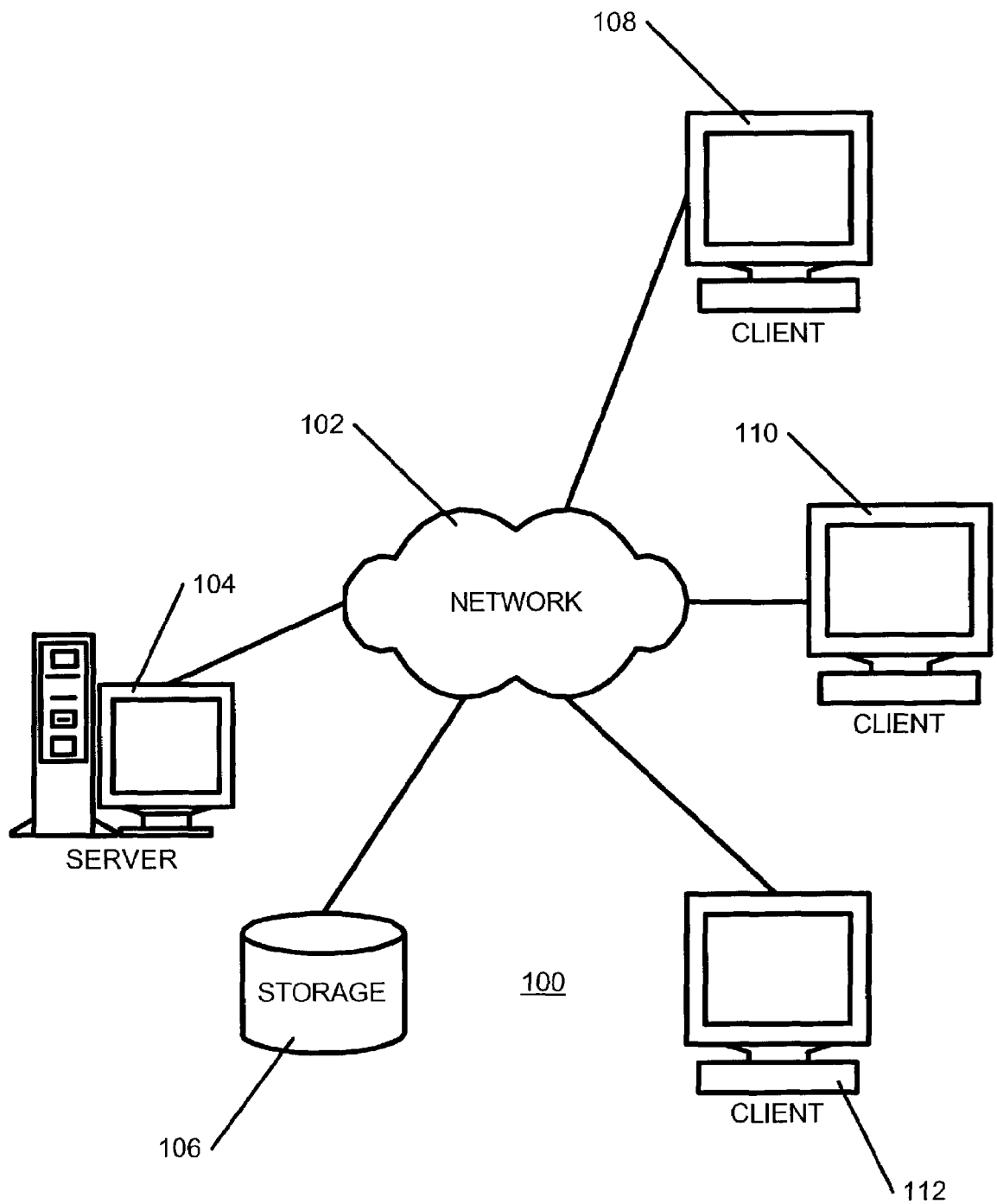
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 may provide data to clients 108, 110 and 112. Clients 108, 110 and 112 are clients of server 104. Network data processing system 100 may include additional servers, clients, and other devices not shown.

Figure 2:
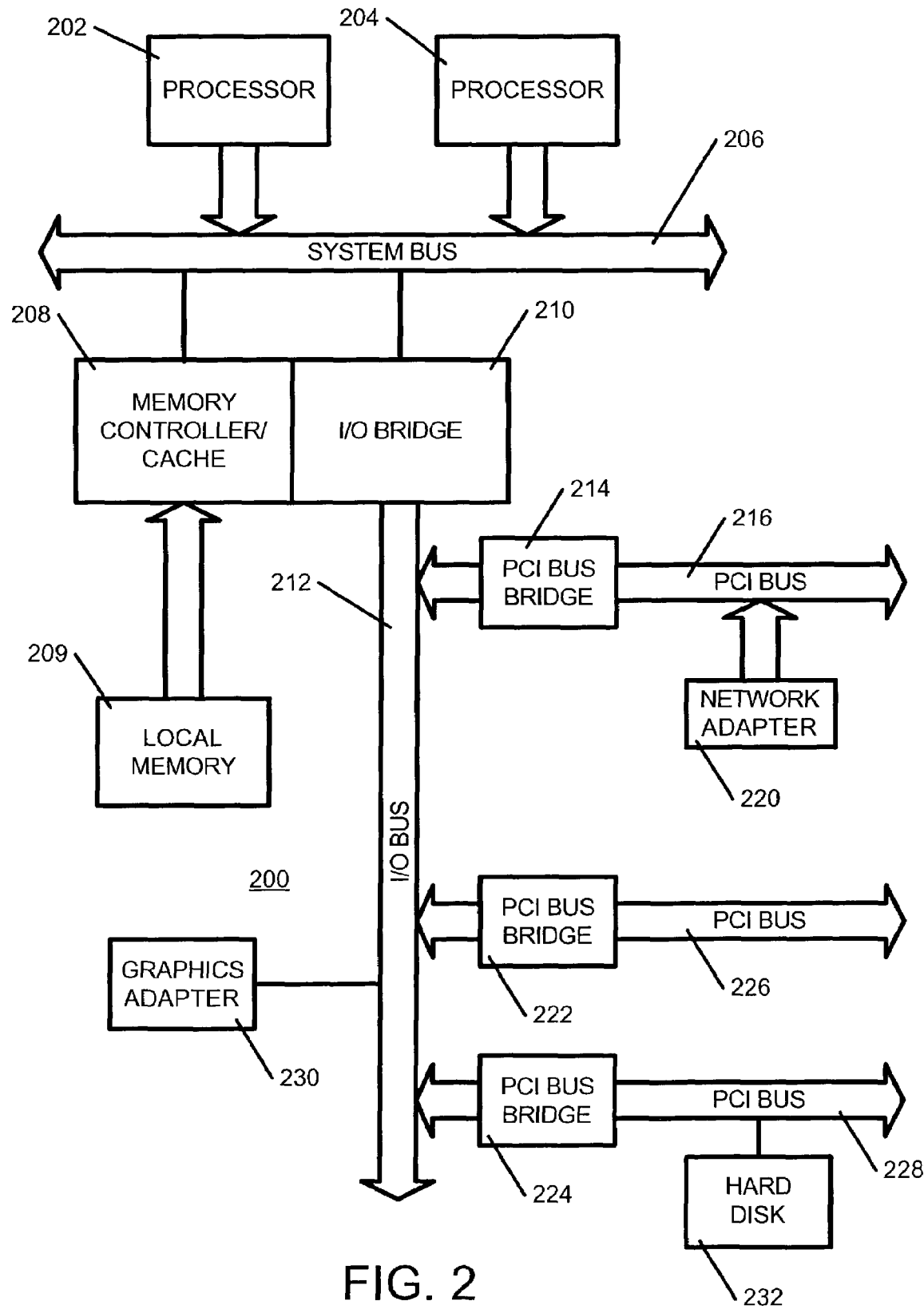
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. Typical PCI bus implementations will support four PCI expansion slots or add-in connectors. Communications links to network computers 108, 110 and 112 in FIG. 1 may be provided through network adapter 220 connected to PCI local bus 216 through add-in boards. Additional PCI bus bridges 222 and 224 provide interfaces for additional PCI local buses 226 and 228, from which additional network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running for example LINUX as an operating system.

Figure 3:
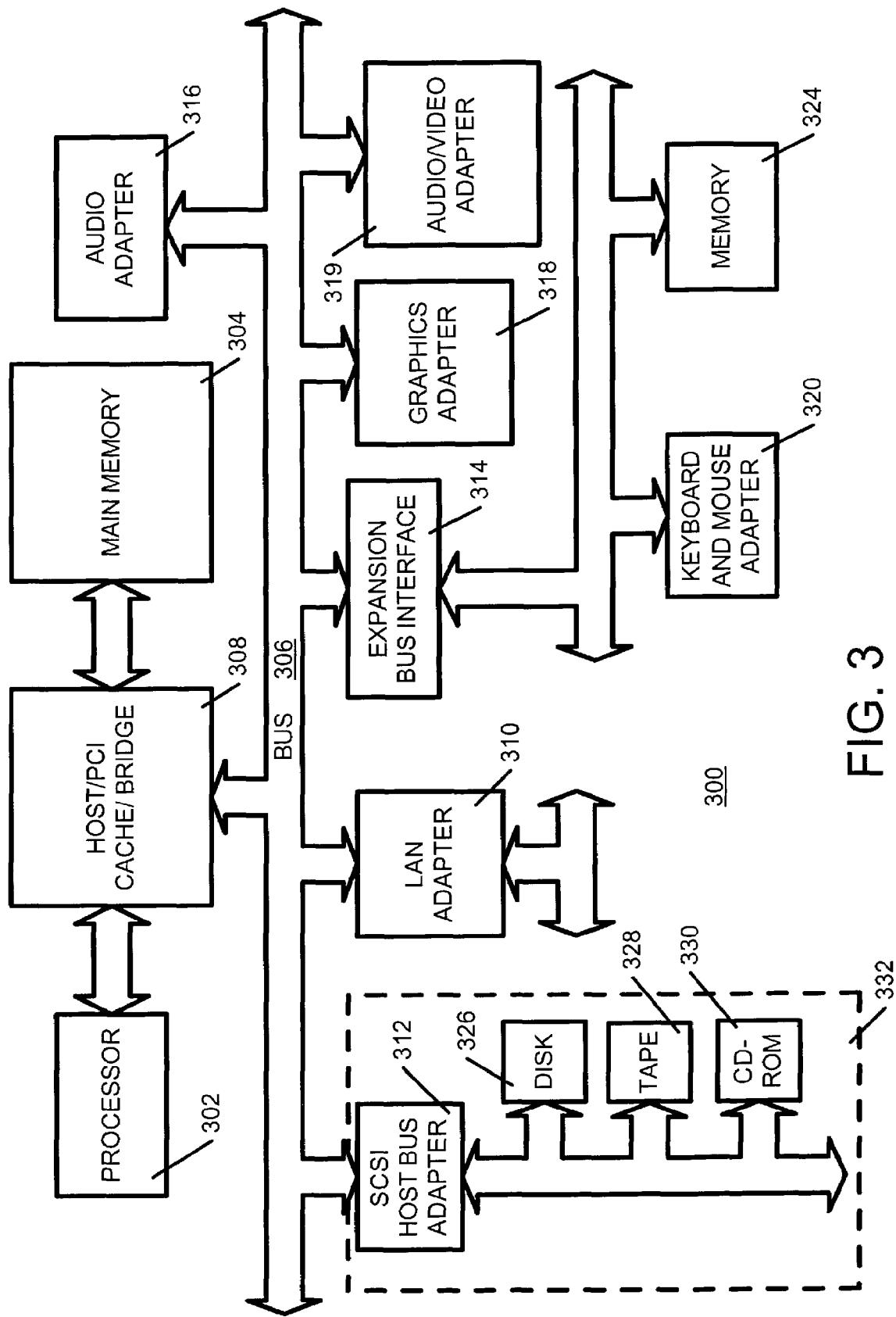
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320 and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as LINUX (available through Red Hat).

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

The present invention is an Ethernet protocol used to transfer data in blocks. The invention resides partly on server 104 and partly on any or all of client systems 108, 110 and 112 of FIG. 1.

Figure 4:
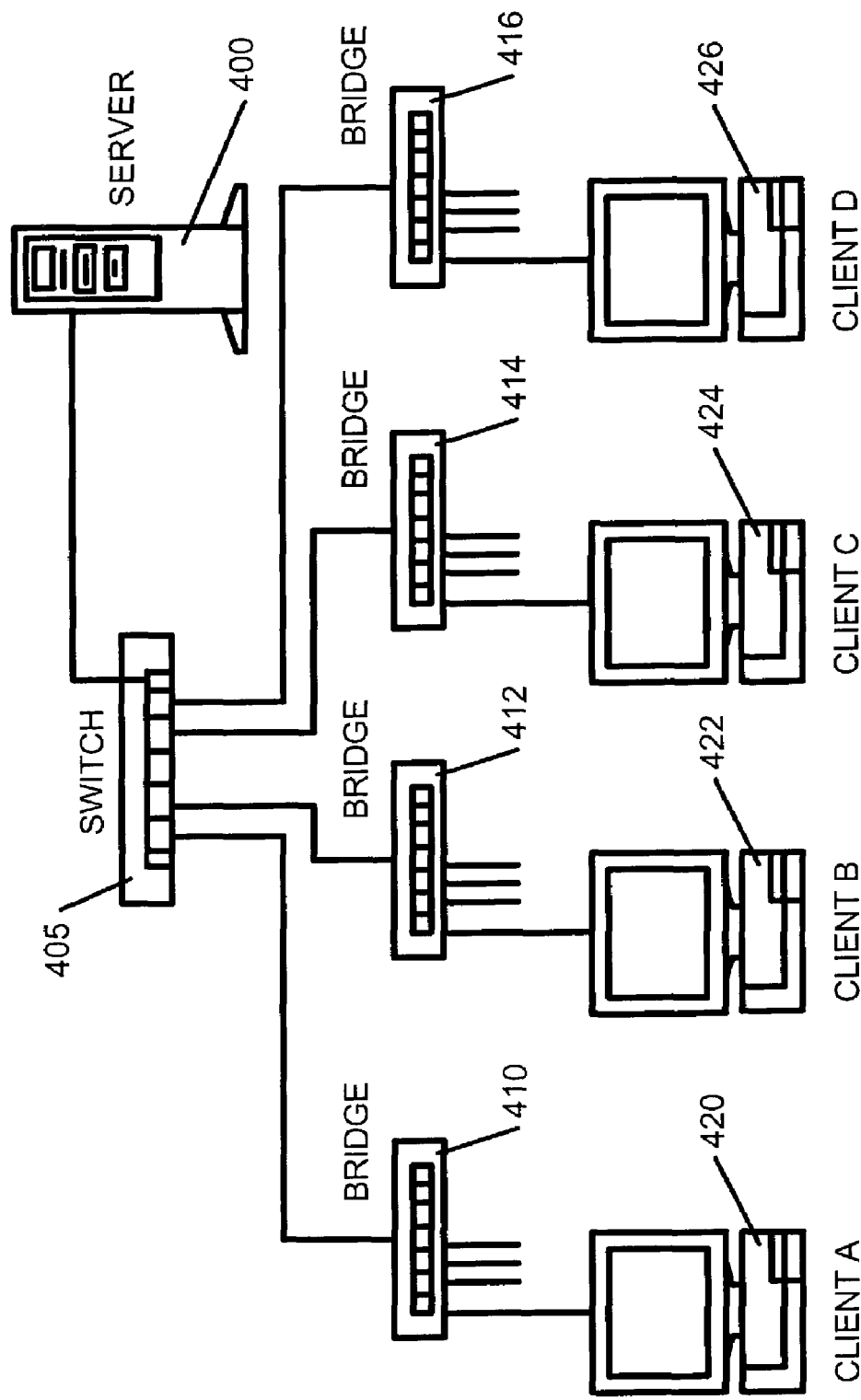
FIG. 4 illustrates a representative local area network (LAN).

FIG. 4 illustrates a representative LAN configuration. In FIG. 4 is depicted a server connected to a plurality of client stations 420-426 through an Ethernet switch 405. Bridges 410-416 may be used between the client stations 420-426 and the Ethernet switch 405. The bridges are used to provide a more organized methodology for expanding the LAN. Thus, based on FIG. 4, a total of four client stations may be connected to each bridge.

Each bridge is connected to a port of the Ethernet switch 405. Similarly, server 400 is connected to a port of switch 405. This configuration allows the server to use one Media Access Control (MAC) address when transacting data over the network. A MAC address is an Ethernet or hardware address that uniquely identifies a computing system on a LAN.

The switch 405 is a link-layer internetworking device that allows simultaneous frame or packet exchange among a large number of computing and networking systems. The switch inspects each incoming data frame for the destination address (i.e., the MAC address) of the target device. It quickly determines the appropriate output port by consulting an internal address map table. If the output port is presently available for use, the switch 405 immediately forwards the frame to the destination. If the output port is not presently available, the switch buffers and forwards the frame when the output port becomes available.

Switches offer a highly efficient organization for LANS. They take advantage of the fact that on a LAN, every device's network interface has a globally unique 48-bit link address (i.e. the MAC address). By keeping track of the relative location of the devices in the interconnected LANs (i.e., which addresses are accessible through which ports), the switch can quickly determine the appropriate port through which to forward data traffic destined for a device. This can be done without the high overhead of using a network layer protocol (e.g., IP) for making this routing decision.

Furthermore, switches allow any device on the network to broadcast or multicast data to any other devices. To broadcast data is to send the data to all the devices on the network whereas to multicast data is to send the data to a select number of devices on the network. By default, switches forward all multicast traffic to all their ports, except the port on which the data arrives. However, a system administrator may program a switch to forward certain data traffic to certain ports or to certain MAC addresses, thus creating virtual LANs (VLANs) within the switched infrastructure.

In any event, since a switch can determine the appropriate port through which to forward data traffic destined for a device without using the TCP/IP suite of protocols, the TCP/IP protocols need not be used in a switched network. Hence, the high overhead associated with using the TCP/IP protocols may be obviated.

The present invention is a newly devised Ethernet protocol that may be used for data transfer. The protocol is based on fixed-size linear arrays of sectors. All protocol parameters are in terms of sectors. Request and response payload data are clustered in blocks of contiguous sectors of 512 bytes of data. The block size is determined by the maximum transmission unit (MTU) of the data link in order to avoid data packet fragmentation, reassembly and out-of-order delivery.

An MTU is the largest physical packet size, measured in bytes, that a network can transmit. Any messages larger than the MTU are divided into smaller packets before being transmitted. Most Ethernet networks have an MTU of 1500; however, since MTU of many network devices are configurable, some networks may have a different MTU. Ideally, packets should be the size of the smallest MTU of all the devices between a transmitting device and a receiving device. If the packet sizes are larger than any intervening device's MTU, the packets will get broken up or fragmented by the device. This, then, will slow down the transmission speed of the data as each fragment will have to be framed correctly as well as numbered appropriately to allow for reassembly at the receiving device. The present invention requires an MTU of 1500, the standard Ethernet MTU, to ensure that packets will not be fragmented in transit. However, where the network permits it, it may use larger MTU sizes such as the new jumbo frame size of 9000. In that case, a system administrator may have to configure the present invention to use the larger size MTU.

The protocol uses a simple request/response mechanism where the response to a request also serves as acknowledgement of having received the request. Requests are sent from a client to a server and responses are sent from a server to a client. Read requests may be clustered so that a single packet can initiate the transfer of up to 255 sectors. In this case, the first sector and the number of sectors that are to be read are identified in the request. Clustered read requests are not fully acknowledged until responses for all requested sectors are received.

Figure 5:
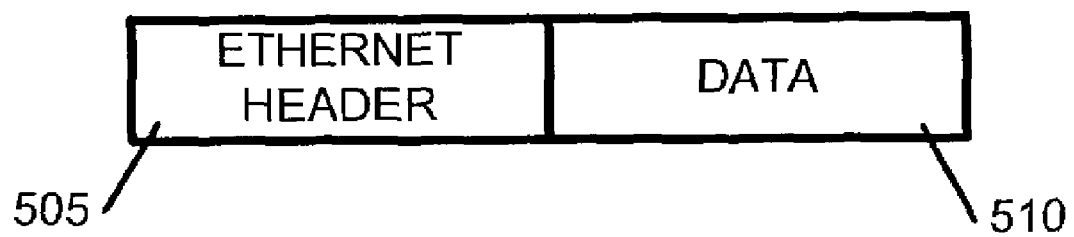
FIG. 5 depicts a data packet with an Ethernet header.

Each packet contains a header identifying the request and its parameters. FIG. 5 depicts a data packet with such a header. As shown, the data packet contains header 505 and user data 510. The header, illustrated in FIG. 6 in bytes format, includes a destination address 600 and a source address 602 for identifying a target device and a source device, respectively. The protocol also contains a frame type field 604 for indicating whether the frame or packet is a MAC (media access control) frame or an LLC (link layer control) frame. Operation field 606 identifies the type of operation that is being requested (i.e., whether a read or a write request). ID 608 is an 8-bit identifier that relates responses to requests.

Although the devices that are transacting the data are known (see the destination and source addresses 600 and 602), the protocol, nonetheless, provides for the device (i.e., hard drive or disk) that contains the requested data to be positively identified. This is done through major field 610 and minor field 612. These two fields indicate major and minor device numbers that are used to indicate the disk containing the data as well as pinpointing the partitions where the data is located.

Flow control 614 is used to negotiate and adjust the maximum number of outstanding blocks that can be in transit at any one time. This allows the server to throttle a particular client or group of clients during periods of peak activity. Thus, although a server may be able to adjust a client behavior during the course of normal transactions, in extreme cases of congestion, the server may initiate window-resizing by unicasting, multicasting or broadcasting a congestion packet to the clients. A congestion packet is a packet having a header with only the flow control field filled in. Note that the minimum allowable window size is one block, anything less is ignored. Length field 616 is used to indicate the length of the request or response in sectors and sector identifier field 618 identifies the first sector.

The user data, when it is present, is located right after sector 618 and before CRC field 620. User data is present during handshakes (described below), write requests and read requests. CRC (cyclic redundancy check) field 620 is used to detect data transmission errors.

Figure 7:
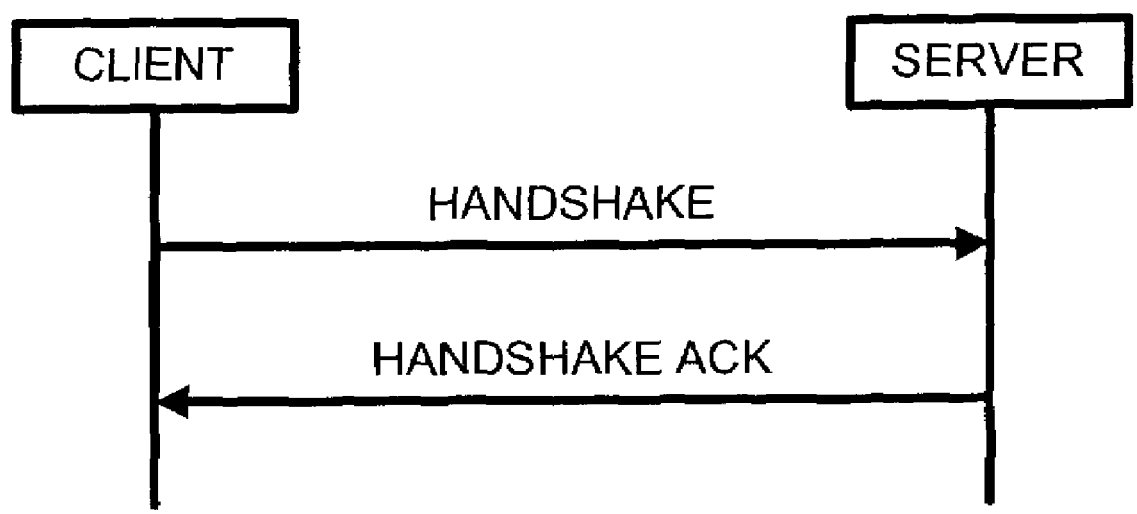
FIG. 7 illustrates a handshake data transaction.

Clients and servers negotiate maximum request size, partition capacity, initial flow control values and window sizes using handshake requests. A handshake request has the frame type field 604, the major number and minor number fields 610 and 612 filled in. FIG. 7 represents a handshake transaction between a client and a server. The client initiates the handshake by sending a handshake request frame and the server responds with an acknowledgement frame. The response maintains the values in the request and fills in the device size in sectors in the sector field 618 along with the maximum sectors per request in the length field 616 and the initial request window size in the flow control field 614.

Figure 8:
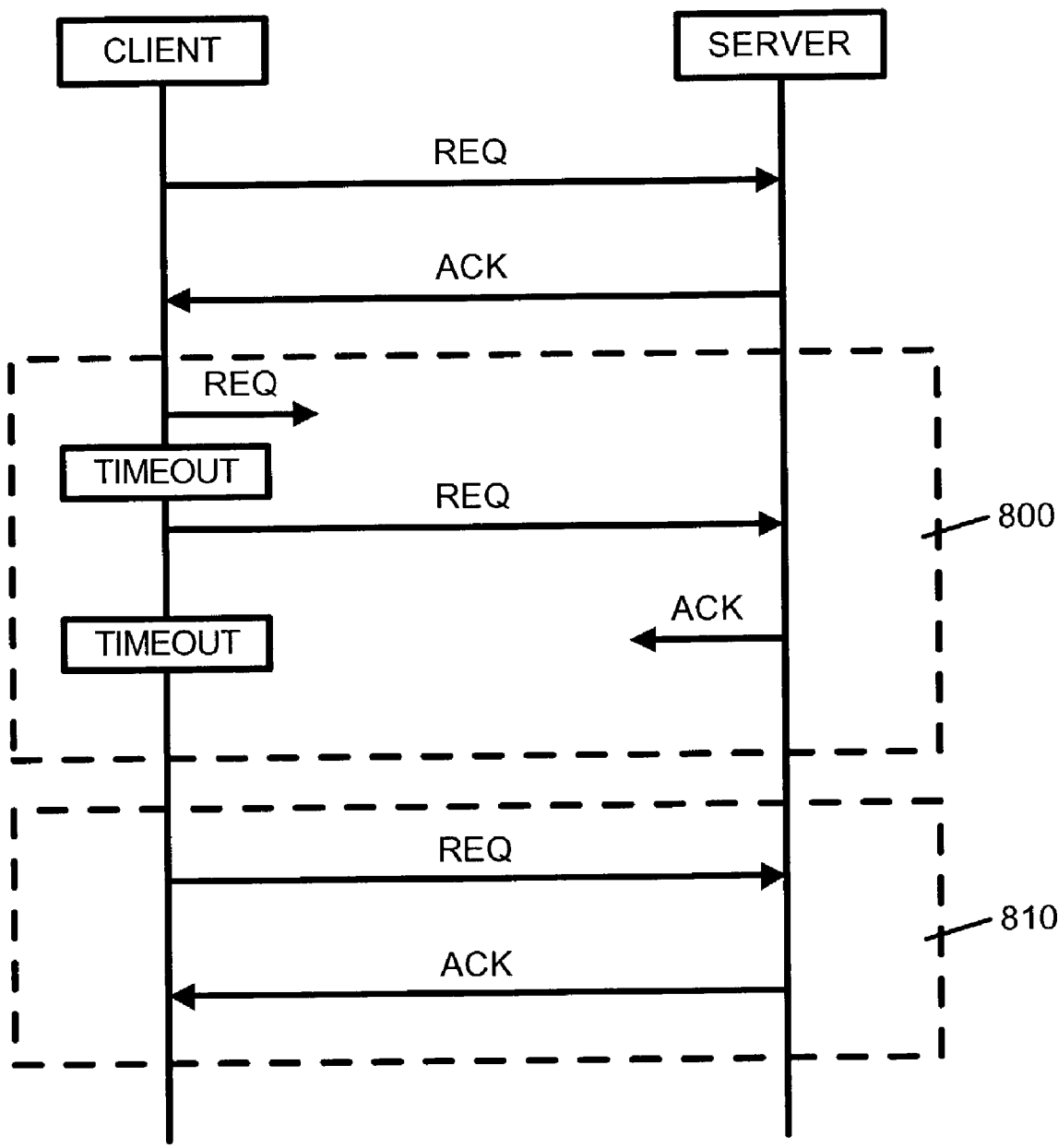
FIG. 8 illustrates a data transaction where time-outs are used for data retransmission.
Figure 9:
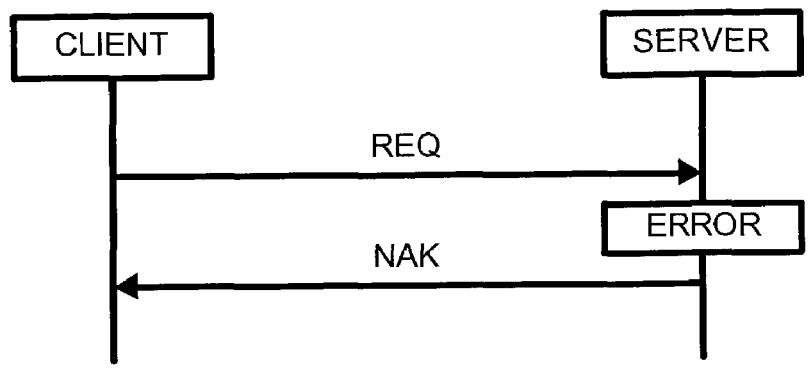
FIG. 9 depicts a NAK data transaction.

Although LANs, the networks for which the present protocol is devised, are reliable networks, there may be instances when packets are lost or become corrupted. In those cases, timeouts are used to force a retransmission of the lost or corrupted packets. FIG. 8 illustrates such retransmission timeouts. In FIG. 8, requests that timeout before a complete response is received (box 800) trigger a resend of the requests (box 810). Partial receptions only request blocks that have not been received. Reception of duplicate responses is silently ignored. This design insulates the server and the protocol from any retransmission policy. Clients are entirely responsible for deciding whether a packet is to be retransmitted. If a request cannot be serviced due to a fatal error on the drive media or file server, a negative acknowledgment (NAK) is transmitted to the client. This is shown in FIG. 9.

Figure 10:
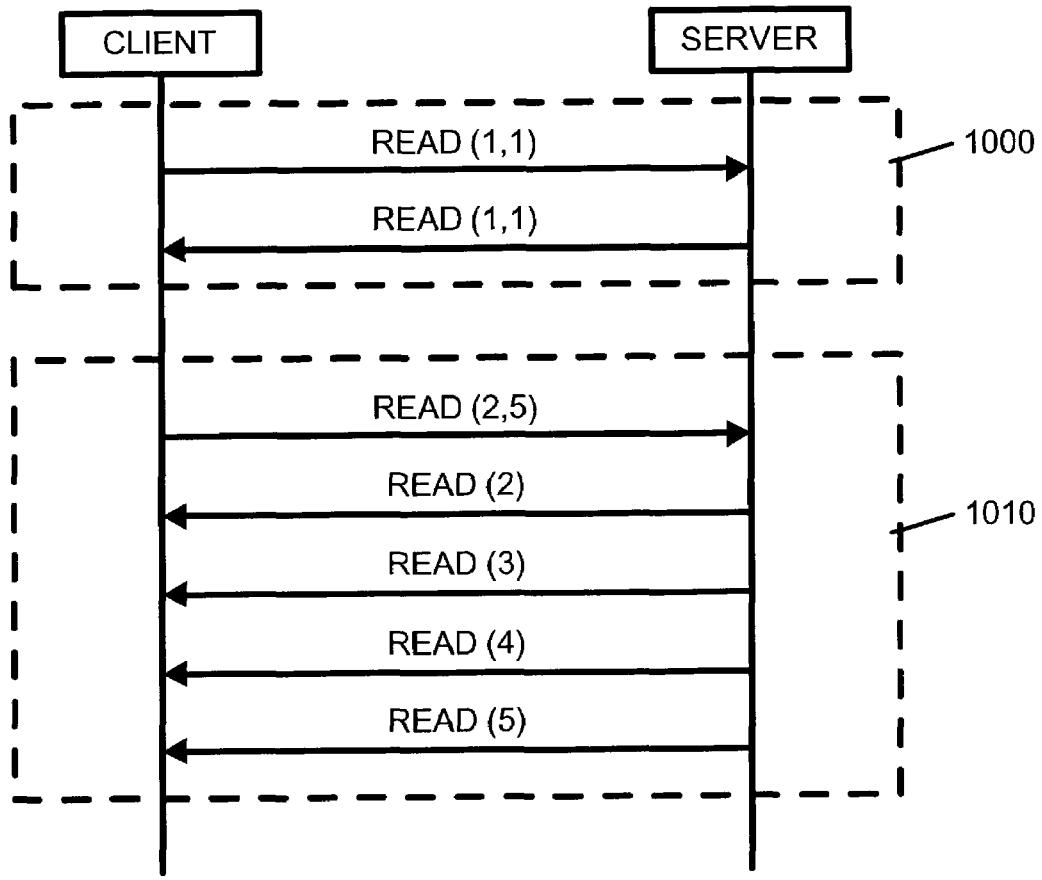
FIG. 10 illustrates a read request data transaction.

READ requests are acknowledged by READ responses containing the data requested. As mentioned earlier, a single READ request can ask for several blocks triggering multiple READ responses. Box 1000 of FIG. 10 represents a single block READ request triggering a single block READ response. Box 1010, on the other hand, illustrates a READ request for multiple blocks. Hence, multiple READ responses ensue from the one READ request.

Figure 11:
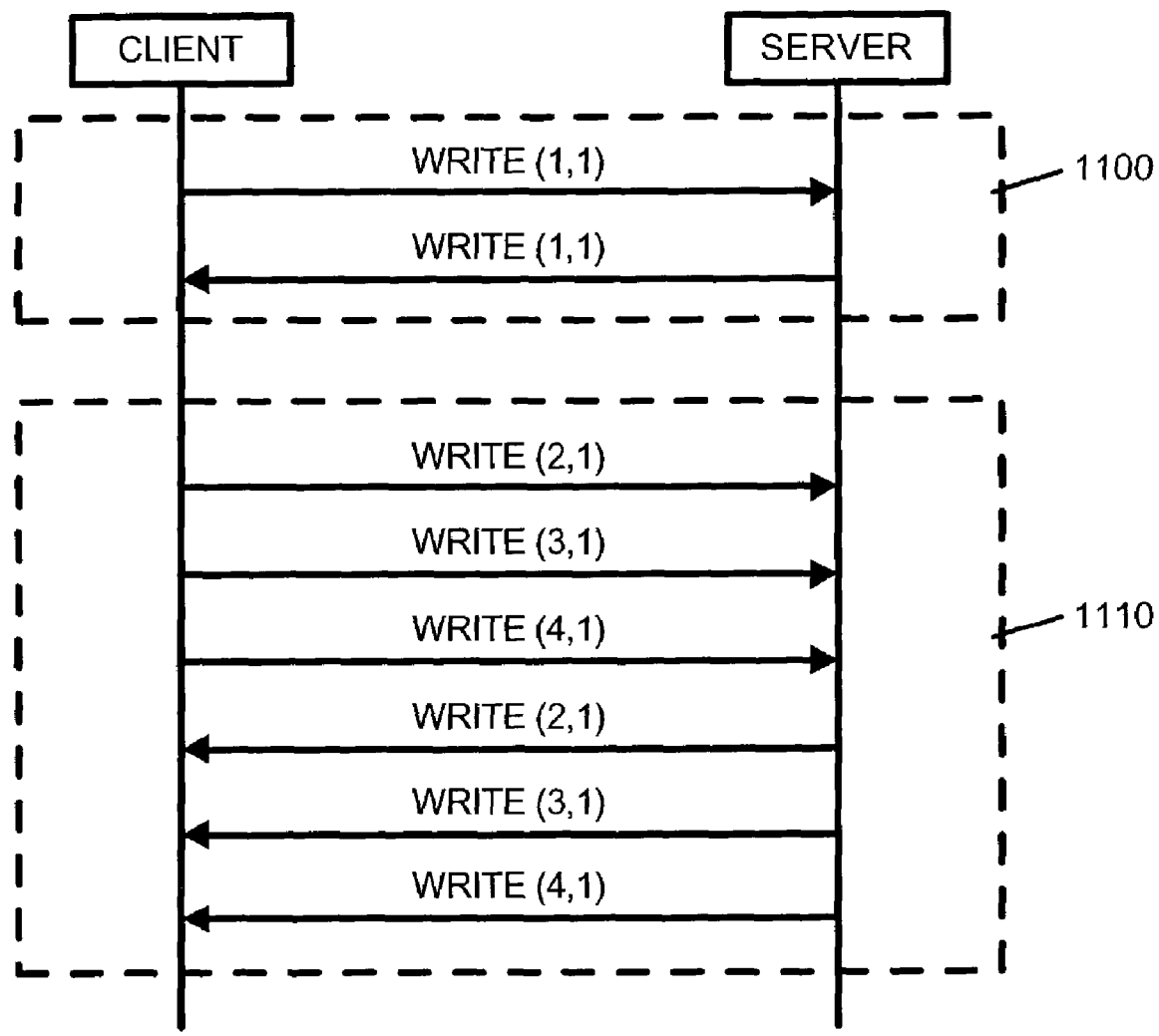
FIG. 11 illustrates a write request data transaction.

WRITE requests, however, are acknowledged by WRITE responses having the same header information but no user data. Acknowledgement of WRITE requests cannot be clustered; thus, a WRITE response is generated for every WRITE request received. This is illustrated in FIG. 11 where there are as many WRITE responses as there are WRITE requests in both boxes 1100 and 1110.

The protocol also supports synchronous WRITE (SYNC-WRITE) operations. SYNC-WRITE operations are not acknowledged until the block is physically committed to the underlying disk or medium. This is particularly useful for journaled file systems (JFSs) and other storage schemes requiring high reliability. JFS is a file system in which the hard disk maintains data integrity in the event of a system crash or if the system is otherwise halted abnormally. JFS maintains a log, or journal, of what activity has taken place in the main data areas of the disk. If a crash occurs, any lost data can be recreated because updates to the metadata in directories and bit maps have been written to a serial log. The JFS not only returns the data to the pre-crash configuration but also recovers unsaved data and stores the recovered data in the location it would have been stored in if the system had not been unexpectedly interrupted.

The protocol also supports FLUSH operations. A FLUSH operation occurs when a client requests that all outstanding blocks of data on the server be written to a disk and that all cached blocks be invalidated. The client may not send any other requests to the server until it has received a FLUSH response.

Figure 12:
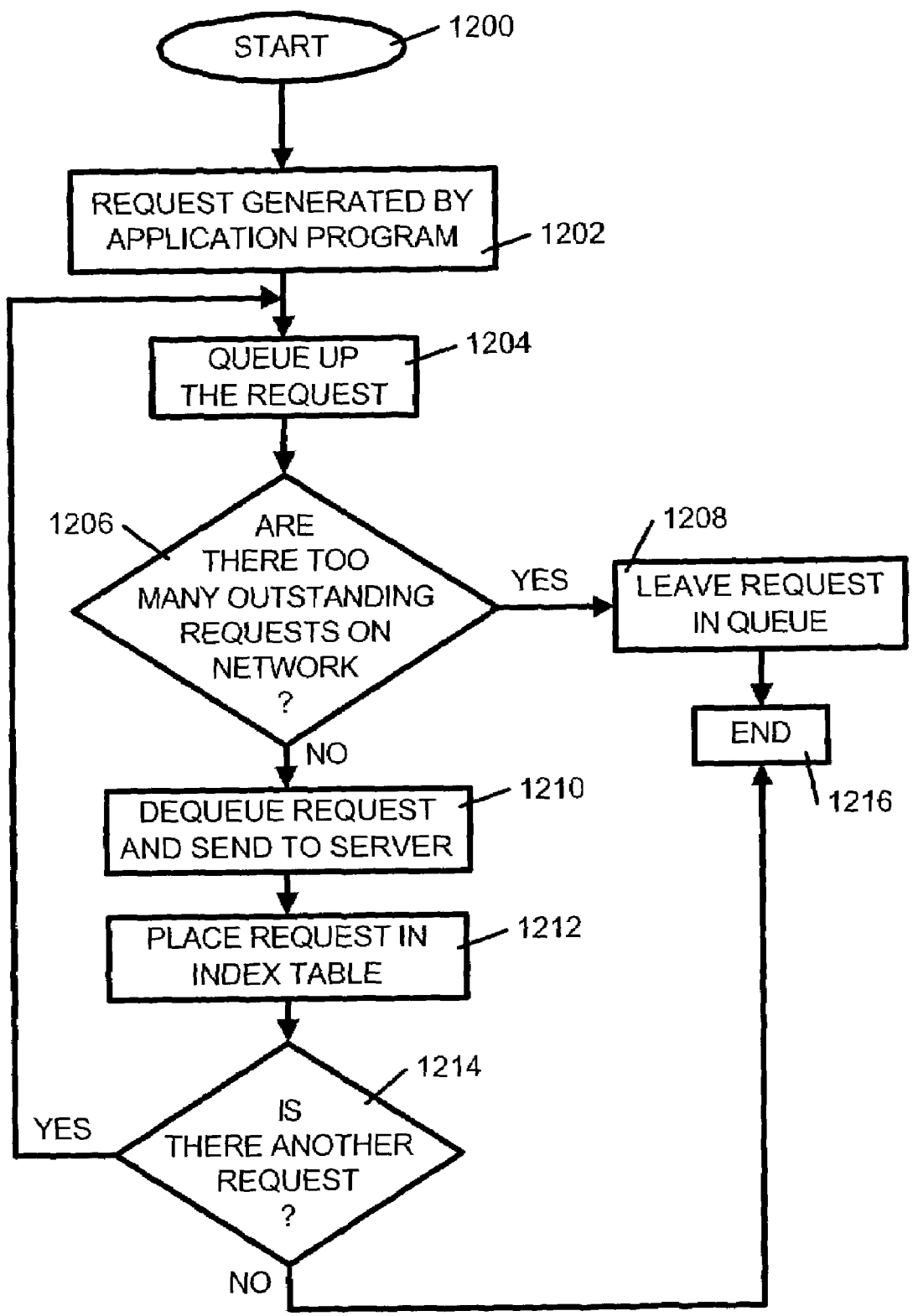
FIG. 12 is a flow chart of a process that may be used by a client transmitting a request to a server.

FIG. 12 is a flow chart of a process that may be used by a client transmitting a request to a server. The process is a driver that is implemented to simulate a disk, including appropriate ioctl function calls for returning size information. An ioctl function performs a variety of device-specific control functions. The process starts when a client is turned on or is refreshed or when the code is loaded into memory (step 1200). When a request is received from a client, the request is queued up in a table. Then a check is made to determine whether there are too many outstanding requests on the network. The maximum number of requests that can be outstanding at any one time on the network is negotiated between the client and the server. If the number of outstanding requests exceeds the maximum number, the request is left in the queue until it has decreased to a number below the negotiated number. The number of outstanding requests is decreased each time a response is received (steps 1202, 1204, 1206 and 1208).

If the number of outstanding requests is less than the maximum number, then the request is de-queued and sent to the server. The request is then put in an indexed table (steps 1206, 1210 and 1212). Then a check is made to determine whether there is another request to process. If so, the process returns to step 1204. If not the process returns to step 1202.

Figure 13:
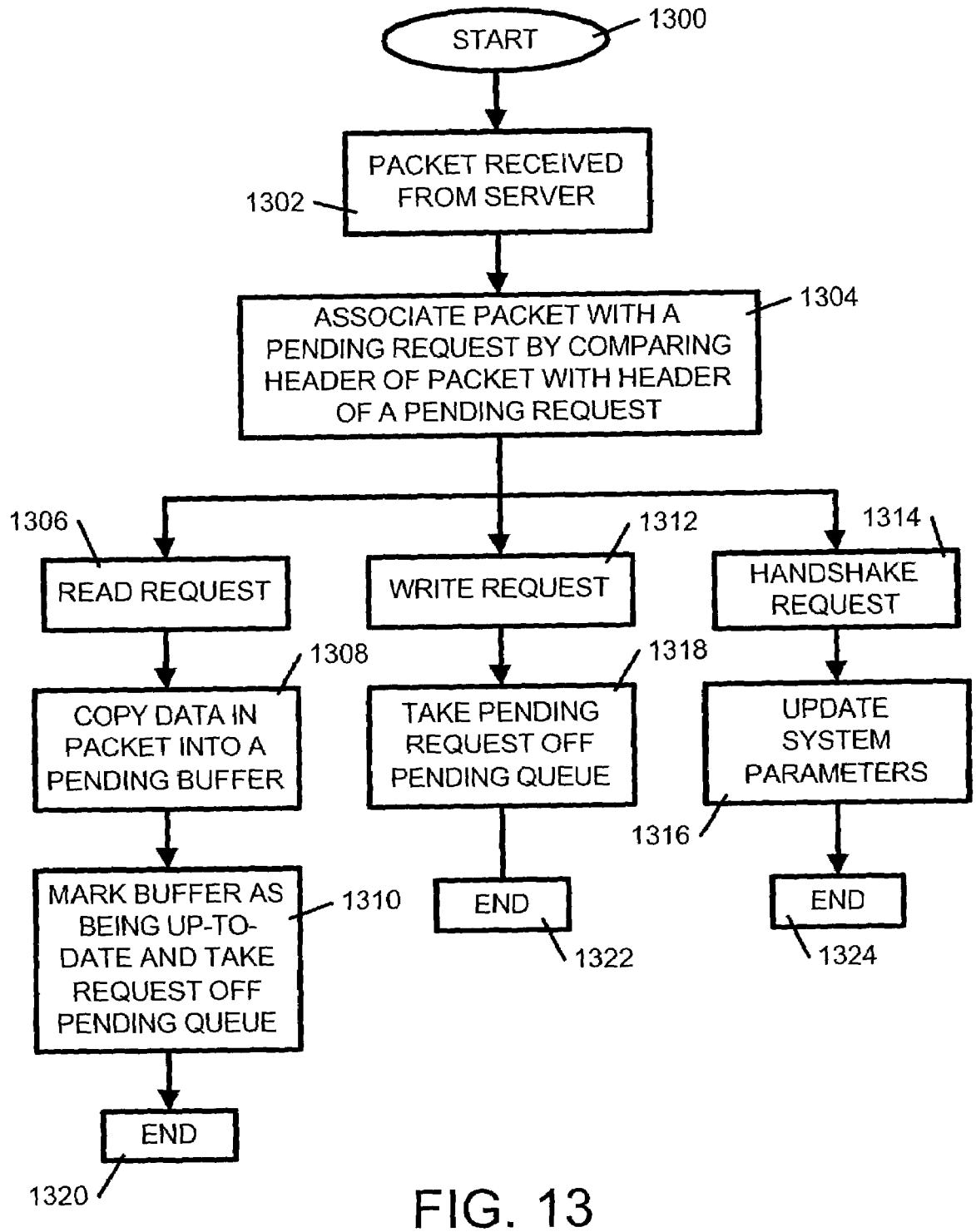
FIG. 13 is a flow chart of a process that may be used by a client receiving a response from a server.

FIG. 13 is a flow chart of a process that may be used by a client receiving a response from a server. The process starts when the client is turned on, refreshed or when the code is loaded into memory (step 1300). When the client receives a packet from the server, it matches the header of the packet with one of the requests in the indexed table (step 1212 of FIG. 12). Then a check is made to determine whether the request was a READ, WRITE or a HANDSHAKE request.

If the request was a READ request, the data in the packet is copied into a pending buffer. The buffer is then marked as being up-to-date and the request is taken off the pending queue and the process returns to step 1302 (steps 1302, 1304, 1306, 1308 and 1310).

If the request was a WRITE request, the request is simply taken off the pending request queue and the process returns to step 1302 (steps 1312 and 1318). If the request was a handshake request, the parameters are updated and the process returns to step 1302 (steps 1314 and 1316).

Figure 14:
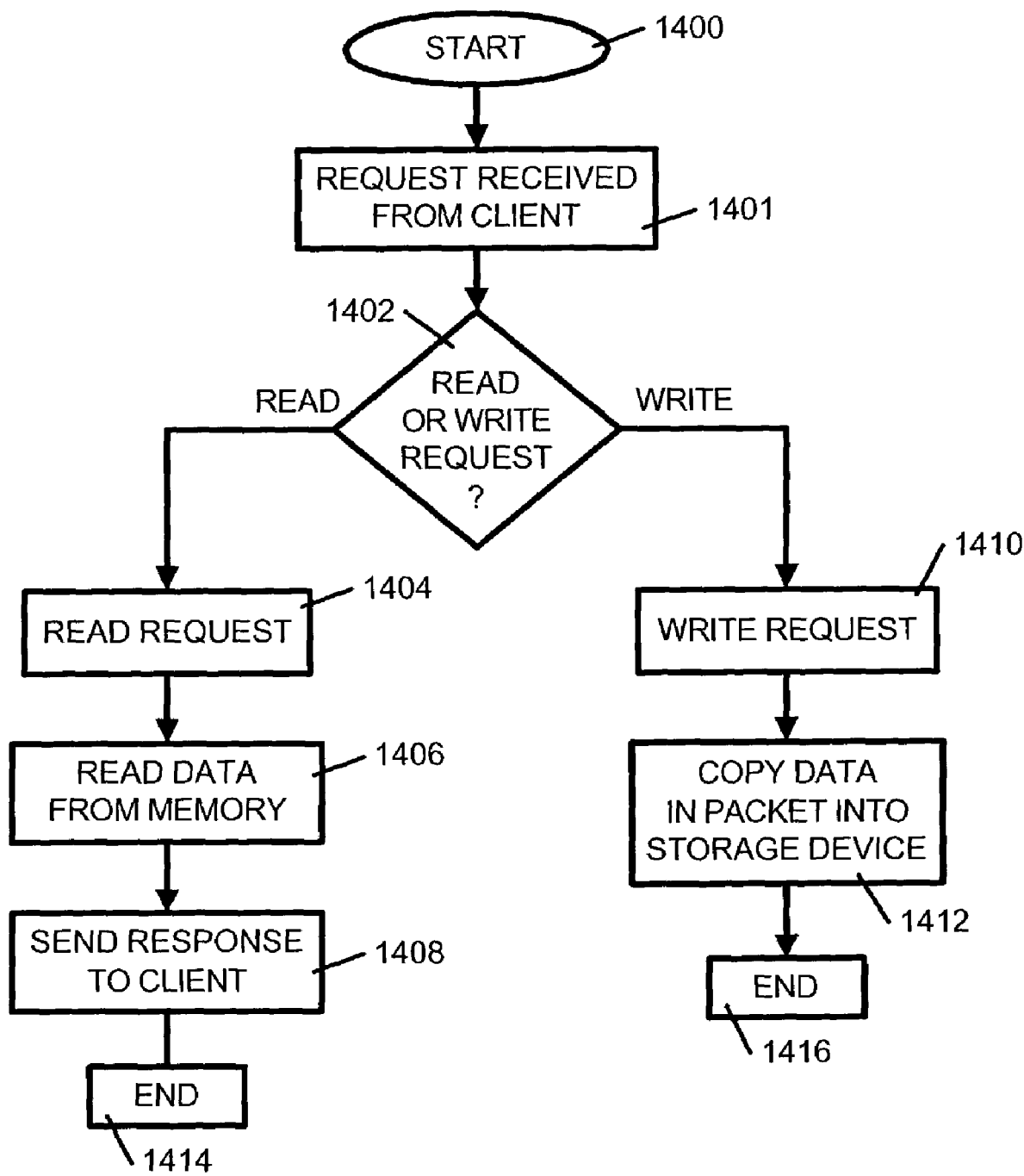
FIG. 14 is a flow chart of a process that may be used by a server that has received a request from a client.

FIG. 14 is a flow chart of a process that may be used by a server that has received a request from a client. The process starts as soon as the server is turned on or refreshed or the code is loaded in memory (step 1400). When the server receives a request, a check is made to determine whether the request is a READ or WRITE request. If it is a READ request, the data is read from a disk, memory buffer or wherever it is being held and sent to the requesting client and the process ends (steps 1402, 1404, 1406 and 1408). If the request is a WRITE request, the data is copied from the packet into a memory buffer and eventually onto a disk or storage device and the process ends (steps 1402, 1410 and 1412). Thus, the server may be viewed as performing the task of a device driver.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of transmitting data over a switched network without using a TCP/IP suite of protocols comprising the steps of:

receiving a request to read a piece of data from a storage system, the piece of data being enabled to be read through one read request when stored in contiguous sectors of the storage system or through multiple read requests when stored in non-contiguous sectors of the storage system wherein the one read request identifying a number of sectors to transmit including the first sector when the piece of data is stored in contiguous sectors of the storage system, wherein when a read request is transmitted, the request is also stored in an indexed table;

accessing the piece of data if the piece of data is stored in contiguous sectors of the storage system or accessing part of the piece of data if the piece of data is stored in non-contiguous sectors of the storage system in response to the received request wherein when one read request is used to request transmission of a multiplicity of sectors, receipts of the sectors are not acknowledged until all the requested sectors are received;

dividing the accessed data into a plurality of packets;

adding a header to each one of the packets, the header having a source and a destination hardware addresses for routing the packets on the switched network; and transmitting the packets.

2. The method of claim 1 wherein the read request is taken off the indexed table after all the requested data is received.

* * * * *